US011068302B2

(12) United States Patent
Grobelny et al.

(10) Patent No.: US 11,068,302 B2
(45) Date of Patent: Jul. 20, 2021

(54) METHOD FOR REGULATING SYSTEM MANAGEMENT MODE FUNCTION CALLS AND SYSTEM THEREFOR

(71) Applicant: DELL PRODUCTS, LP, Round Rock, TX (US)

(72) Inventors: Nicholas D. Grobelny, Austin, TX (US); Girish S. Dhoble, Austin, TX (US); Ricardo L. Martinez, Leander, TX (US); Abeye S. Teshome, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/445,966

(22) Filed: Jun. 19, 2019

(65) Prior Publication Data

US 2020/0401443 A1 Dec. 24, 2020

(51) Int. Cl.
*G06F 9/48* (2006.01)
*G06F 9/30* (2018.01)

(52) U.S. Cl.
CPC .......... *G06F 9/4837* (2013.01); *G06F 9/3013* (2013.01)

(58) Field of Classification Search
CPC ........... G06F 9/45; G06F 13/32; G06F 9/4825
See application file for complete search history.

(56) References Cited

U.S. PATENT DOCUMENTS

| 10,318,385 | B2 | 6/2019 | Bryant et al. | |
|---|---|---|---|---|
| 2015/0066864 | A1* | 3/2015 | Kuhl | H04L 67/1097 707/665 |
| 2015/0369505 | A1* | 12/2015 | Malve | F24F 11/70 700/276 |
| 2016/0103665 | A1* | 4/2016 | Liu | G06F 11/3644 717/158 |
| 2016/0178225 | A1* | 6/2016 | Vallikannu | F24F 11/62 700/276 |
| 2016/0266942 | A1 | 9/2016 | Grobelny et al. | |
| 2016/0330164 | A1* | 11/2016 | Bellan | H04L 63/08 |
| 2017/0024342 | A1* | 1/2017 | Jain | G06F 9/4825 |
| 2017/0132164 | A1 | 5/2017 | Martinez et al. | |
| 2018/0324162 | A1 | 11/2018 | Teshome et al. | |

* cited by examiner

*Primary Examiner* — Getente A Yimer
(74) *Attorney, Agent, or Firm* — Larson Newman, LLP (57) ABSTRACT

A method includes saving state information in response to receiving a system management interrupt (SMI), the state information including a first value retrieved from a first register and a second value retrieved from a second register. The method further includes determining a function associated with the SMI based on the first value and determining a calling address associated with the SMI based on the second value. A counter corresponding to the function and calling address pair is incremented in response to receiving the SMI. The method concludes by selectively invoking the function based on the value of the counter and based on a predetermined threshold.

20 Claims, 5 Drawing Sheets

METHOD FOR REGULATING SYSTEM MANAGEMENT MODE FUNCTION CALLS AND SYSTEM THEREFOR

FIELD OF THE DISCLOSURE

This disclosure generally relates to information handling systems, and more particularly relates to regulating system management mode function calls.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A method may include saving state information in response to receiving a system management interrupt (SMI), the state information including a first value retrieved from a first register and a second value retrieved from a second register. The method further includes determining a function associated with the SMI based on the first value and determining a calling address associated with the SMI based on the second value. A counter corresponding to the function and calling address pair is incremented in response to receiving the SMI. The method concludes by selectively invoking the function based on the value of the counter and based on a predetermined threshold.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

An information handling system typically includes a basic input/output system that initializes the system after power is applied or after a restart operation is performed. At completion of the initialization process, an operating system is typically launched, and the system is said to be operating in a runtime mode. During runtime, there are still system management tasks that need to be performed, and some of these tasks are administered using a scheme known as a system management mode (SMM). SMM is an operating mode in which all normal execution, including the operating system, is suspended, and an alternate software system is invoked to provide various services. For example, SMM can be invoked to handle system events such as memory or chipset errors, manage thermal and power activities, provide access to security subsystems such as a Trusted Platform Module, and the like.

SMM is invoked in response to a hardware or a software interrupt, known as a system management interrupt (SMI). When an SMI is asserted, SMM program instructions stored at a special partition of system memory known as SMRAM are executed, starting with an SMM master function that is stored at a region of SMRAM configured to store SMM code. The master function is responsible for saving system state information to a region of SMRAM configured to store SMM data. After the state information has been saved, a function identified by the SMI can be invoked by software handlers that that resides in the SMRAM code partition. An excessive number of SMI events, possibly due to malicious activities or faulty software, can significantly impact the computational performance of the information handling system. Techniques disclosed herein can regulate SMM function invocation to address this problem.

Figure 1:
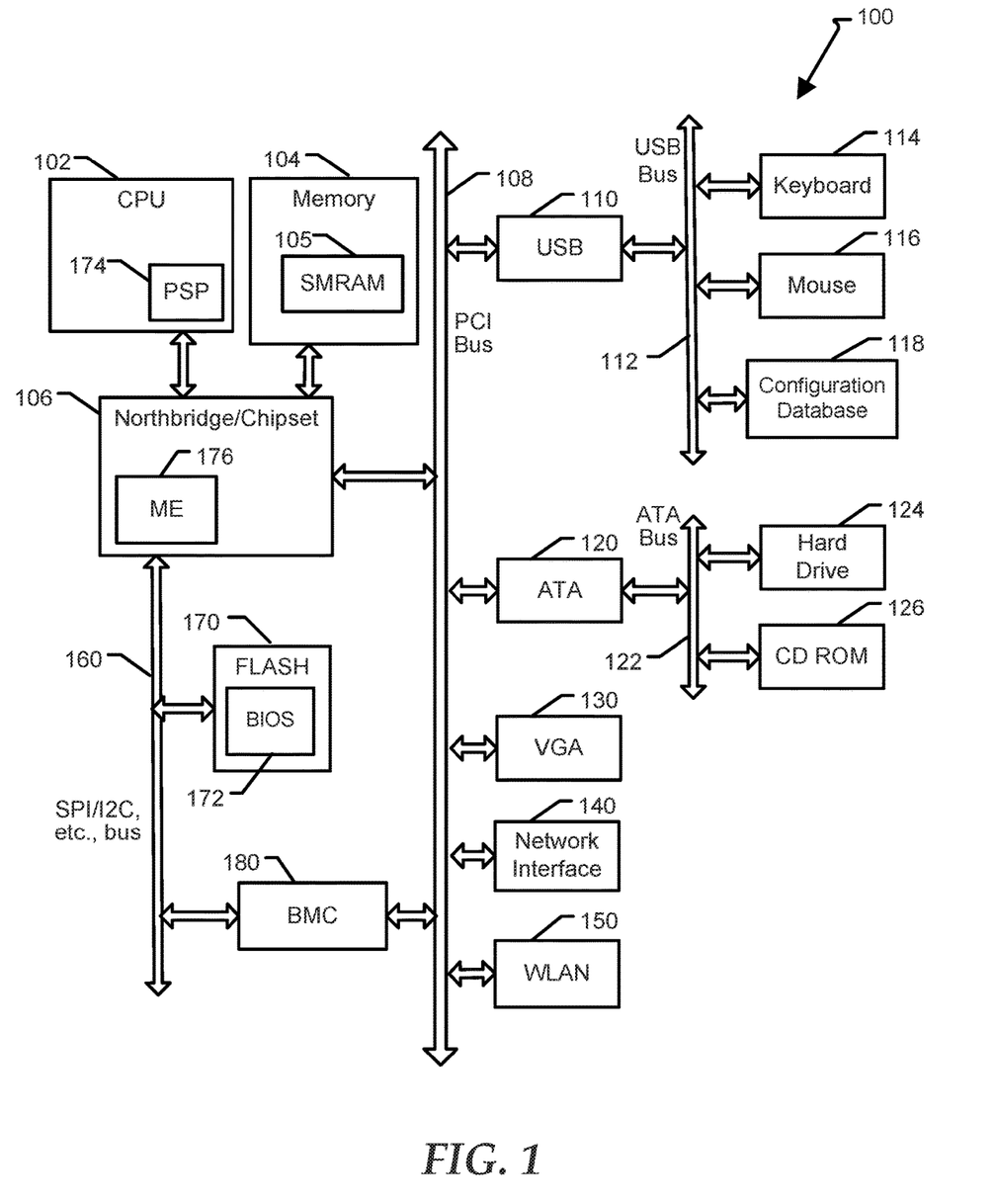
FIG. 1 is a block diagram of an information handling system according to an embodiment of the present disclosure.

FIG. 1 illustrates an information handling system 100 including a processor 102, a memory 104, a chipset 106, a PCI bus 108, a universal serial bus (USB) controller 110, a USB 112, a keyboard device controller 114, a mouse device controller 116, a configuration database 118, an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a first flash memory device 170 for storing BIOS code 172, and a baseboard management controller (BMC) 180. In an embodiment, memory 104 includes a partition SMRAM 105 containing code and data associated with SMM operation.

BMC 180 can be referred to as a service processor, and embedded controller (EC), and the like. The terms BMC and EC are interchangeable with regard to the present disclosure. Flash memory device 170 can be referred to as a SPI flash device, BIOS SPI, and the like. BMC 180 is configured to provide out-of-band and/or side-band access to devices at information handling system 100. As used herein, out-of-band access herein refers to operations performed without support of CPU 102, such as prior to execution of BIOS code 172 by processor 102 to initialize operation of system 100.

In an embodiment, system 100 can further include a platform security processor (PSP) 174 and/or a management engine (ME) 176. In particular, an x86 processor provided by Advanced Micro Devices (AMD) can include PSP 174, while ME 176 is typically associated with systems based on Intel x86 processors, and can be included at chipset 106. PSP 174 and ME 176 are processors that can operate independently of core processors at CPU 102, and that can execute firmware prior to the execution of the BIOS by a primary CPU core processor. PSP 174 is a microcontroller that includes dedicated read-only memory (ROM) and static random access memory (SRAM). PSP 174 is an isolated processor that runs independently from the main CPU processor cores. PSP 174 has access to firmware stored at flash memory device 170. During the earliest stages of initialization of system 100, PSP 174 is configured to authenticate the first block of BIOS code stored at flash memory device 170 before releasing the x86 processor from reset.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One ore more components can be integrated together. For example, portions of chipset 106 can be integrated within CPU 102. In an embodiment, chipset 106 can include a platform controller hub (PCH). System 100 can include additional buses and bus protocols, for example I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

BIOS code 172 can be referred to as a firmware image, and the term BIOS is herein used interchangeably with the term firmware image, or simply firmware. BIOS code 172 includes instructions executable by CPU 102 and PSP 174 to initialize and test the hardware components of system 100, and to load a boot loader or an operating system (OS) from a mass storage device. BIOS code 172 additionally provides an abstraction layer for the hardware, i.e. a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

In an embodiment, the BIOS code 172 can be substantially compliant with one or more revisions of the UEFI specification. The UEFI standard replaces the antiquated personal computer BIOS system found in some older information handling systems. However, the term BIOS is often still used to refer to the system firmware. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the operating system. The UEFI specification allows for the extension of platform firmware by loading UEFI driver and UEFI application images. For example, an original equipment manufacturer can include customized or proprietary images to provide enhanced control and management of the information handling system 100. While the techniques disclosed herein are described in the context of a UEFI compliant system, one of skill will appreciate that aspects of the disclosed systems and methods can be implemented at substantially any information handling system having configurable firmware.

Figure 2:
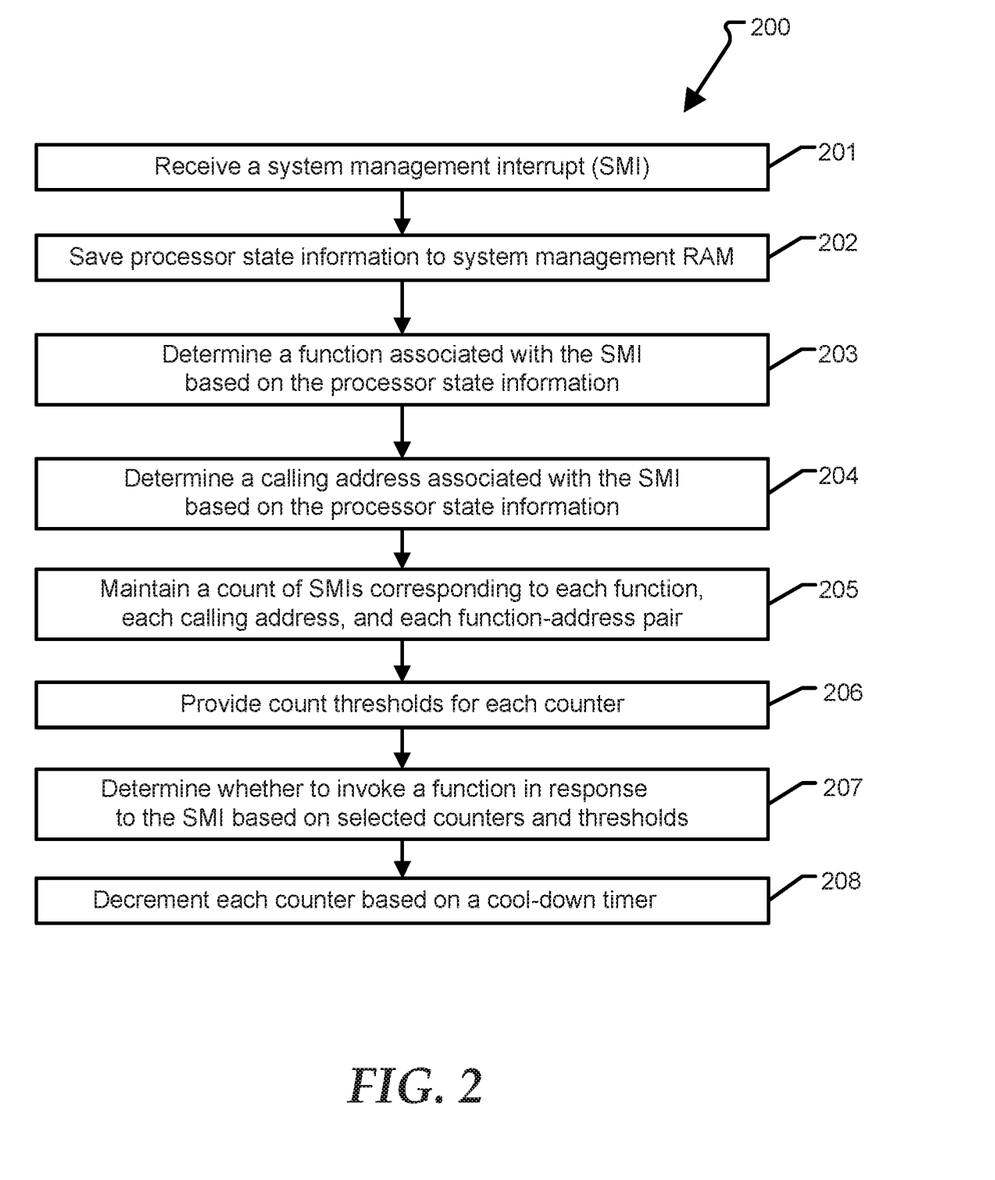
FIG. 2 is a flow diagram illustrating a method for regulating invocation of system management mode function calls according to a specific embodiment of the present disclosure.

FIG. 2 shows a method 200 for regulating invocation of SMM function calls according to a specific embodiment of the present disclosure. Method 200 begins at block 201 where an SMI is received. The SMI causes CPU 102 to begin executing SMM master function instructions stored a partition of SMRAM 105 associated with SMM code. At block 202, the master function saves processor state information to a data partition of SMRAM 105. For example, CPU 102 can retrieve the contents of X86 extended accumulator register (EAX), extended instruction pointer (EIP), and the like, and save the retrieved values at SMRAM 105. Upon exiting SMM, the saved state information is restored to these registers so that the previously interrupted operations can be resumed. At block 203, the SMM master function determines the identity of a function associated with the SMI. For example, the SMI may be asserted by a routine configured to modify a system password. The routine can identify the password function by storing a corresponding value at register EAX, and the SMM master function can identify the function by evaluating the EAX value that was saved to SMRAM. In an embodiment the value stored at EAX may directly identify the SMI function that is being called. In another embodiment, the value stored at EAX may provide a pointer to information identifying the function. While the present example utilizes a value stored at EAX to identify the SMM function, another register whose content is saved at block 202 can be used.

At block 204, the SMM master function determines a calling address associated with the SMI. Continuing the present example, the calling address may be identified by the contents of register EIP, either directly or indirectly, or by the contents of another register whose contents is saved at block 202. At block 205, the master function maintains a count of SMIs corresponding to each SMM function, a count of SMI corresponding to each SMI calling address, and a count of each SMI corresponding to each unique pair of SMM function and SMI calling address, referred to herein as a function-address pair. For example, an SMI may be issued to invoke a function FA from a calling address A1. Accordingly, the SMM master function increments a counter corresponding to function FA, increments a counter corresponding to address A1, and increments a counter corresponding to the function-address pair, FA and A1. Additional counters are allocated for every other unique function, calling address and function-address pair. At block 206, count thresholds corresponding to each allocated counter are provided. Each counter threshold can be provided by BIOS firmware, generated by the SMM master function, retrieved from BMC 180, or retrieved from another location.

At block 207, the SMM master function determines whether to invoke the function identified by an SMI based on selected counters and associated counter threshold values. This operation is described in detail below with reference to FIGS. 3-5. Method 200 completes at block 208, where each of the counters can be decremented periodically based on cool-down timer. The cooldown timer and counter decrementing is performed independently from the previous operations of method 200, and is described in detail below with reference to FIG. 6. One of skill will appreciate that the SMM function counters can be implemented as counters that are initialized to a predetermined value, decremented in response to a corresponding SMI, and incremented based on the cooldown timer.

Figure 3:
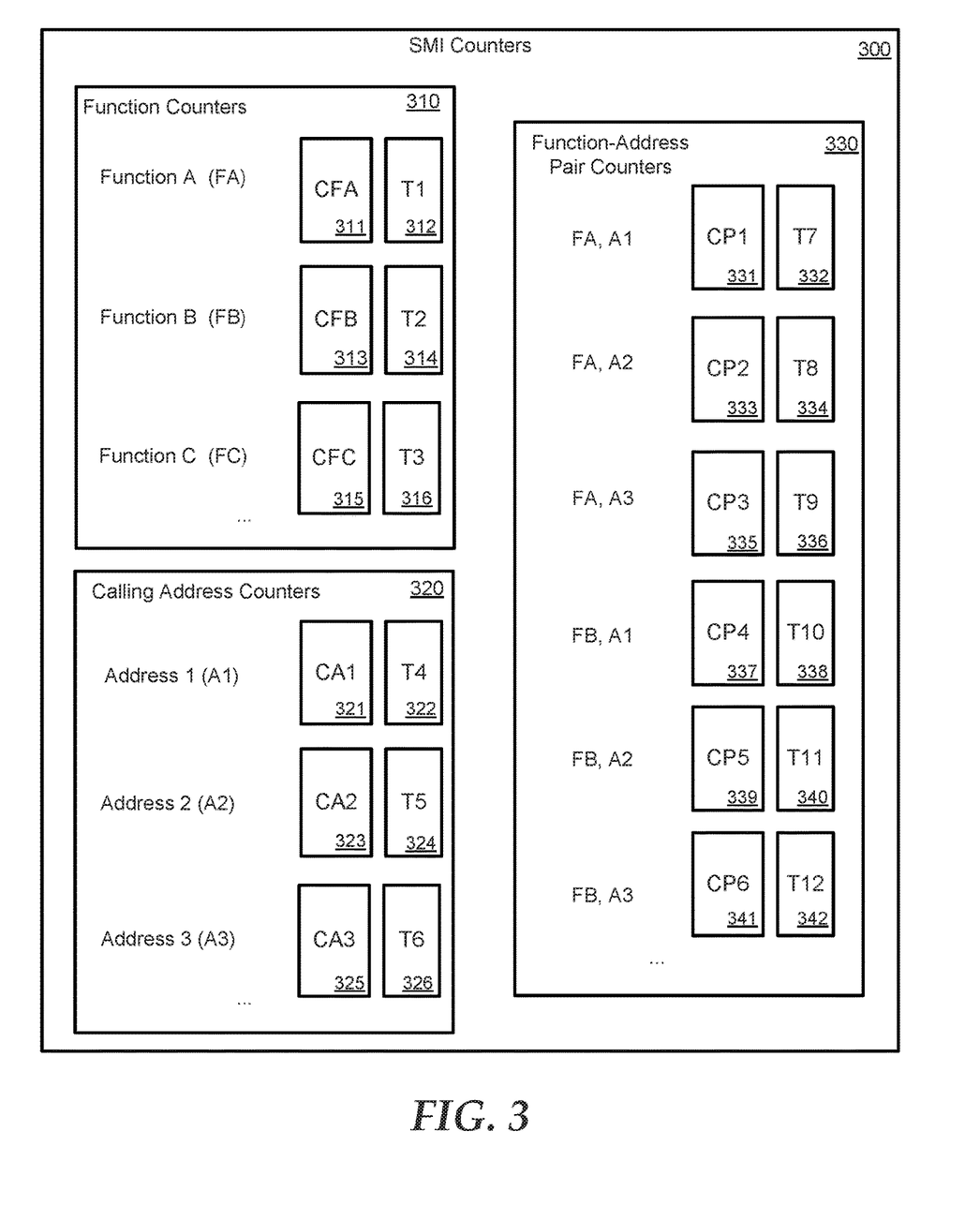
FIG. 3 is a block diagram illustrating system management interrupt counters according to a specific embodiment of the present disclosure.

FIG. 3 shows SMI counters 300 according to a specific embodiment of the present disclosure. The counters can be maintained and manipulated by the SMM master function and the counter values can be stored in the SMM data region of SMRAM 105. SMI counters 300 include function counters 310, calling address counters 320, and function-address pair counters 330. Function counters 310 include a counter and a threshold value corresponding to each type of SMM function that is available at information handling system 100. The identity of a function associated with an SMI can be determined directly, or indirectly, from a value of a register that was saved to SMRAM by the SMM master function. For clarity, only three function counters are illustrated, including a counter CFA 311 and a corresponding threshold value T1 312 associated with function A (FA), a counter CFB 313 and a corresponding threshold value T2 314 associated with function B (FB), and a counter CFC 315 and corresponding threshold value T3 316 associated with function C (FC). As used herein, an SMI can be asserted by a calling entity to request that a particular function (task) be performed. For example, a function can include changing a system password, locking down a flash device, managing a cooling fan, and the like.

Calling address counters 320 include a counter and a threshold value corresponding to the calling address associated with each SMI. The identity of a calling address associated with an SMI can be determine directly, or indirectly, from a value of a register that was saved to SMRAM by the SMM master function. Again for clarity, only three calling address counters are illustrated, including a calling address counter CA1 321 and corresponding threshold T4 322, a calling address counter CA2 323 and corresponding threshold T5 324, and a calling address counter CA3 325 and corresponding threshold T6 326.

Function-address pair counters 330 include a counter and a threshold value corresponding to each function and calling address combination (pair). Again for clarity, only six function-address counters are illustrated, including a function-address pair counter CP1 331 and a corresponding threshold value T7 332 associated with an SMI directed to function FA and calling address A1, a function-address pair counter CP2 333 and a corresponding threshold value T8 334 associated with an SMI directed to function FA and calling address A2, a function-address pair counter CP3 335 and a corresponding threshold value T9 336 associated with an SMI directed to function FA and calling address A3, a function-address pair counter CP4 337 and a corresponding threshold value T10 338 associated with an SMI directed to function FB and calling address A1, a function-address pair counter CP5 339 and a corresponding threshold value T11 340 associated with an SMI directed to function FB and calling address A2, and a function-address pair counter CP6 341 and a corresponding threshold value T12 342 associated with an SMI directed to function FB and calling address A3.

Particular counters at counters 310, 320, and 330 can be updated by the SMM master function in response to each SMI. For example, in response to an SMI corresponding to function FB and calling address A1, the SMM master function can increment function counter CFB 313, increment calling address counter CA1 321, and increment function-address pair counter CP4 337 that corresponds to function FB and calling address A1.

Figure 4:
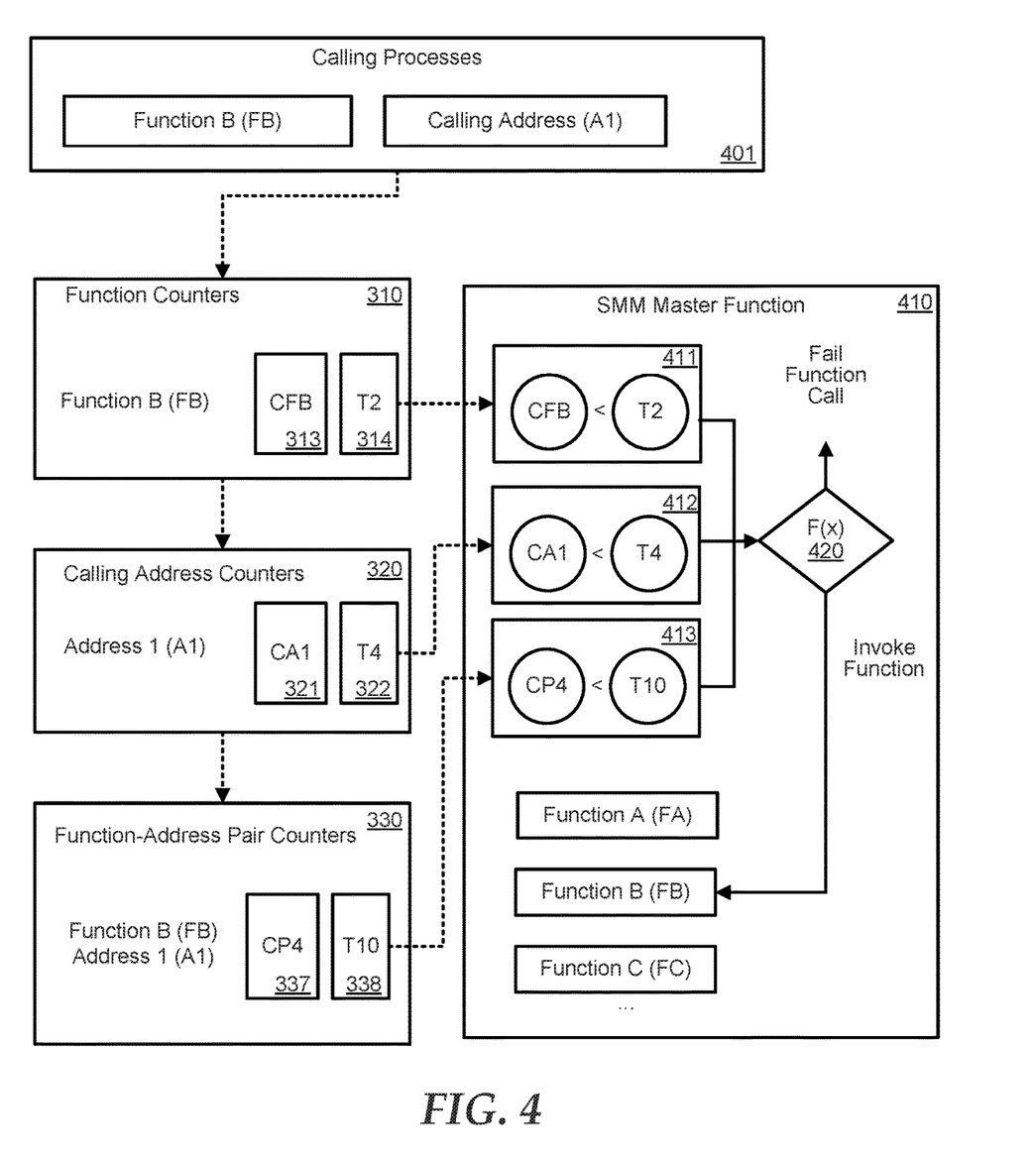
FIG. 4 is a block diagram illustrating how function counters, calling address counters, and function-address pair counters can be used to regulate the invocation of system management mode function calls according to a specific embodiment of the present disclosure.

FIG. 4 shows how function counters, calling address counters, and function-address pair counters can be used to regulate the invocation of SMM function calls according to a specific embodiment of the present disclosure. In particular, FIG. 4 illustrates how the SMM master function 410, implemented by instructions stored at the SMM code region, determines whether to allow the function call to proceed or reject invocation of the function call. The example shown in FIG. 4 includes a calling process 401 that represents an SMI directed to invoking function FB from a calling address A1. Accordingly, only the counters associated with function FB, calling address A1, and function-address pair CP4 corresponding to function FB and calling address A1 are used to determine whether the function call associated with the SMI is invoked, or whether the function call is rejected.

In response to assertion of the SMI, the SMM master function 410 can first increment values maintained at each appropriate counter, counters CFB 313, CA1 321, and CP4

337 in the present example. Counters that are not associated with function FB and calling address CA1 are not incremented and are not considered when determining whether to allow or to block the present SMI request. After the counters corresponding to the current SMI are incremented, SMM master function 410 is configured to compare one or more of the counters associated with the SMI to the counter's respective threshold value. For example, block 411 illustrates comparing the value of function counter CFB 313 with the corresponding threshold value T2 314, block 412 illustrates comparing the value of calling address counter CA1 321 with the corresponding threshold value 322, and block 413 illustrates comparing the value of function-address pair counter CP4 337 with the corresponding threshold value T10 338. Based on a configuration of function F(x) 420, master function 410 can selectively invoke or block function FB. For example, in one embodiment, function FB can be invoked if all counters associated with the calling process have a value that is less than their respective threshold. For example, if the value maintained at function counter CFB 313 is less than the value of threshold T2 314, the value maintained at calling address counter CA1 321 is less than the value of threshold T4 322, and the value maintained at calling function-address pair counter CP4 337 is less than the value of threshold T10 338, than function FB is invoked. After function FB has been performed according to a corresponding software handler included at the SMM code region, state information prior to the SMI is restored and information handling system 100 returns to activities that were underway prior to the SMI, under the control of the operating system. However, if a value maintained at any of counters 313, 321, or 337 is equal to or greater than respective threshold values 314, 322, and 338, the function call fails (function FB is blocked from being performed), state information prior to the SMI is restored, and information handling system 100 returns to activities under the control of the operating system.

Function F(x) 420 can allow or block an SMM function based on other rules. In another embodiment, master function 410 can determined whether to allow invocation of a function based only on a value maintained at the function-address pair counter and the respective threshold value. For example, a process may periodically issue an SMI to monitor the speed of a cooling fan. Accordingly, the function-address pair counter corresponding to this legitimate process can be associated with a relatively high threshold value so that the function call is typically allowed to proceed, even if values at counters associated with the specific function or calling address exceed their respective thresholds. However, if a malicious process is trying a denial of service attack by repetitively issuing SMIs directed to the same cooling fan speed function, the calling address of the malicious process would be different than the calling address of the legitimate process. Accordingly, values at one or all of the function, calling-address, and function-address pair counters may exceed their respective thresholds and the malicious function call can be blocked.

Figures 5, 6:
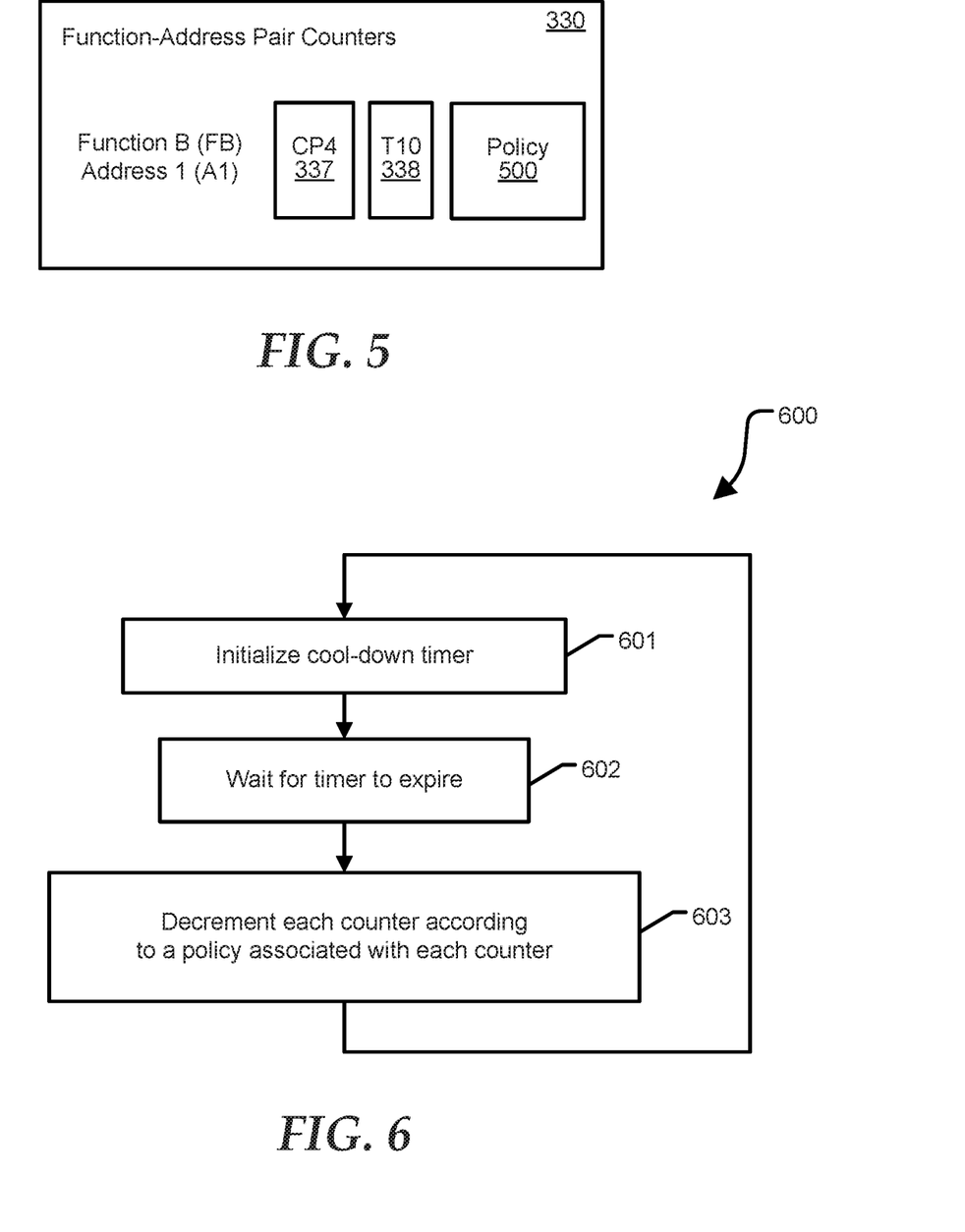
FIG. 5 is a block diagram illustrating a system management interrupt counter that includes a policy to further control system management mode function invocation according to a specific embodiment of the present disclosure.
FIG. 6 is a flow diagram illustrating a method for providing a cool-down timer to periodically decrement count values maintained at the system management interrupt counters, according to a specific embodiment of the present disclosure.

FIG. 5 shows an SMI counter that includes a policy to further control SMM function invocation according to a specific embodiment of the present disclosure. In particular, a counter can include an associated invocation policy that can be taken into consideration by function 420. For example, an invocation policy associated with the function-address pair counter corresponding to the legitimate fan speed monitor function can specify that the individual function counter and calling address counter that correspond to the function-address pair should be ignored. FIG. 5 shows function-address pair counter 330 of FIG. 4 with the addition of a policy 500. In an embodiment, each SMI counter can include policy information. Alternatively, only selected counters may include policy information. In another embodiment, policy 500 can be used to enable or disable consideration of a respective counter when evaluating whether to invoke or to block an SMM function call. Policy 500 may also include cool-down configuration information, described below with reference to FIG. 6.

FIG. 6 shows a method 600 for providing a cool-down timer to periodically decrement count values maintained at the SMI counters of FIG. 3, according to a specific embodiment of the present disclosure. A cool-down timer can be implemented in hardware or software and is configured provide an indication of the passing of a predetermined amount of time. For example, the cool-down timer can be configured to assert an SMI every second. The cool-down timer operates independently of the SMM function calls and the function invocation process. Method 600 begins at block 601 where a cool-down timer is initialized to a value representing a particular amount of time. For example, the cool-down timer can be implemented as a counter, which is initialized to a desired value. In an embodiment, a cool-down timer can be implemented using a chipset register that can be configured by the BIOS, and the timer can issue an SMI at a desired cadence. For example, a hardware or software clock signal can periodically decrement the cool-down timer counter, and the cool-down timer can be said to expire when the counter has been decremented to zero. At block 602, the cool-down timer is allowed to expire.

Method 600 completes at block 603 where each SMI counter can be decremented according to a cool-down policy associated with each counter. For example, policy 500 can specify that SMI counter 330 is decremented once for every ten cool-down timer intervals, while a cool-down policy associated with another SMI counter could have a different decrementing rate. In an embodiment, policy 500 can specify that a respective SMI counter is decremented in a linear fashion relative to the cool-down timer interval, or in an exponentially increasing or decreasing fashion. Accordingly, the cool-down timer interval, threshold values, and policies can each be configured to regulate how quickly a particular SMM function call may become blocked in response to a series of SMI events, and how quickly invocation of the function is resumed if the number of events over time decreases. In an embodiment, more than one cool-down timer can be implemented so that decrementing of one SMI counter can be associated with one cool-down timer, while decrementing of another SMI counter can be associated with another cool-down timer.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media. A network interface device (not shown at FIG. 1) can provide connectivity to a network, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
    receiving a system management interrupt (SMI);
    invoking a system management mode (SMM) master function in response to receiving the SMI, the SMM master function to:
        save state information, the state information including a first value retrieved from a first register and a second value retrieved from a second register;
        determine a first function associated with the SMI based on the first value;
        determine a first calling address associated with the SMI based on the second value;
        increment a first counter corresponding to a unique combination of the first function and the first calling address; and
        selectively invoking the first function based on the value of the first counter and based on a first predetermined threshold.

2. The method of claim 1, wherein selectively invoking the first function comprises:
    invoking the first function if a value of the first counter is less than a first predetermined threshold; and
    blocking invocation of the first function if the value of the first counter is greater than or equal to the first predetermined threshold.

3. The method of claim 1, further comprising a cool-down timer to periodically decrement the first counter.

4. The method of claim 1, further comprising:
    incrementing a second counter corresponding to the first function; and
    selectively invoking the first function further based on a value of the second counter and based on a second predetermined threshold.

5. The method of claim 1, further comprising:
incrementing a third counter corresponding to the first calling address; and
selectively invoking the first function further based on a value of the third counter and based on a third predetermined threshold.

6. The method of claim 5, further comprising:
retrieving an invocation policy associated with the first counter, the invocation policy specifying whether to invoke or to block the first function based exclusively on the first counter and the first predetermined threshold.

7. The method of claim 5, further comprising a cool-down timer to periodically decrement the first counter, the second counter and the third counter.

8. The method of claim 1, wherein the saving, determining, incrementing, and selectively invoking are performed by an SMM master function.

9. The method of claim 1, wherein the first predetermined threshold is generated during build time of a basic input/output system image.

10. The method of claim 1, wherein:
the saving, determining, incrementing, and selectively invoking are performed by an SMM master function; and
the first predetermined threshold is updated by the SMM master function.

11. An information handling system comprising:
a memory including a first partition to store system management mode (SMM) instructions and SMM data; and
a processor to invoke an SMM master function in response to determining that a system management interrupt (SMI) has been initiated, the SMM master function to:
save state information, the state information including a first value retrieved from a first register and a second value retrieved from a second register;
determine a first function associated with the SMI based on the first value;
determine a first calling address associated with the SMI based on the second value;
increment a first counter corresponding to a unique combination of the first function and the first calling address; and
selectively invoke the first function based on the value of the first counter and based on a first predetermined threshold.

12. The information handling system of claim 11, wherein the processor is further to:
invoke the first function if a value of the first counter is less than a first predetermined threshold; and
block invocation of the first function if the value of the first counter is greater than or equal to the first predetermined threshold.

13. The information handling system of claim 11, further comprising a cool-down timer to periodically decrement the first counter.

14. The information handling system of claim 11, wherein the processor is further to:
increment a second counter corresponding to the first function; and
selectively invoke the first function further based on a value of the second counter and based on a second predetermined threshold.

15. The information handling system of claim 14, wherein the processor is further to:
incrementing a third counter corresponding to the first calling address; and
selectively invoking the first function further based on a value of the third counter and based on a third predetermined threshold.

16. The information handling system of claim 15, wherein the processor is further to:
retrieve an invocation policy associated with the first counter, the invocation policy specifying whether to invoke or to block the first function based exclusively on the first counter and the first predetermined threshold.

17. The information handling system of claim 15, further comprising a cool-down timer to periodically decrement the first counter, the second counter and the third counter.

18. The information handling system of claim 11, wherein the saving, determining, incrementing, and selectively invoking are performed by an SMM master function.

19. The information handling system of claim 11, wherein:
the saving, determining, incrementing, and selectively invoking are performed by an SMM master function; and
the first predetermined threshold is updated by the SMM master function.

20. A method performed by a system management mode master function, the method comprising:
saving state information in response to receiving a system management interrupt (SMI), the state information including a first value retrieved from a first register and a second value retrieved from a second register;
determining a first function associated with the SMI based on the first value;
determining a first calling address associated with the SMI based on the second value;
incrementing a first counter corresponding to a unique combination of the first function and the first calling address; and
selectively invoking the first function based on the value of the first counter and based on a first predetermined threshold.

* * * * *